US011485901B2

(12) United States Patent
Shen et al.

(10) Patent No.: US 11,485,901 B2
(45) Date of Patent: Nov. 1, 2022

(54) POLYMERIC SYSTEMS FOR PARTICLE DISPERSION

(71) Applicant: RHODIA OPERATIONS, Paris (FR)

(72) Inventors: Lingjuan Shen, Yardley, PA (US); Qi Qu, Spring, TX (US); Jian Zhou, Langhorne, PA (US); Arnaud Cadix, Saint-Ouen (FR); Ruela Pabalan, Burlington, NJ (US); Subramanian Kesavan, East Windsor, NJ (US); David James Wilson, Coye la Foret (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/823,770

(22) Filed: Nov. 28, 2017

(65) Prior Publication Data
US 2018/0148635 A1 May 31, 2018

Related U.S. Application Data

(60) Provisional application No. 62/427,246, filed on Nov. 29, 2016.

(51) Int. Cl.
| | | |
|---|---|---|
| C09K 8/66 | (2006.01) |
| C09K 8/68 | (2006.01) |
| E21B 43/267 | (2006.01) |
| C09K 8/72 | (2006.01) |
| C09K 8/86 | (2006.01) |
| C08F 2/18 | (2006.01) |
| C08F 2/44 | (2006.01) |
| C08L 33/26 | (2006.01) |
| C09K 8/74 | (2006.01) |
| C09K 8/80 | (2006.01) |
| C09K 8/88 | (2006.01) |

(52) U.S. Cl.
CPC ............... *C09K 8/725* (2013.01); *C08F 2/18* (2013.01); *C08F 2/44* (2013.01); *C08L 33/26* (2013.01); *C09K 8/665* (2013.01); *C09K 8/68* (2013.01); *C09K 8/74* (2013.01); *C09K 8/80* (2013.01); *C09K 8/86* (2013.01); *C09K 8/882* (2013.01); *E21B 43/267* (2013.01); *C09K 2208/12* (2013.01); *C09K 2208/26* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 4,432,881 A * | 2/1984 | Evani | ............... | C09D 7/43 |
| | | | | 166/275 |
| 4,565,647 A | 1/1986 | Llenado | | |
| 6,153,705 A * | 11/2000 | Corpart | ............... | C08F 293/005 |
| | | | | 525/244 |
| 2002/0161087 A1* | 10/2002 | Heitz | ............... | C08F 293/00 |
| | | | | 524/379 |
| 2005/0000694 A1 | 1/2005 | Dalrymple et al. | | |
| 2006/0180308 A1 | 8/2006 | Welton et al. | | |
| 2009/0107681 A1* | 4/2009 | Hough | ............... | C09K 8/44 |
| | | | | 166/308.3 |
| 2009/0260820 A1* | 10/2009 | Kurian | ............... | C09K 8/5083 |
| | | | | 166/292 |
| 2012/0157356 A1* | 6/2012 | Dawson | ............... | C09K 8/602 |
| | | | | 507/219 |
| 2014/0090850 A1* | 4/2014 | Benicewicz | ............... | C09K 8/70 |
| | | | | 166/308.2 |
| 2014/0166291 A1 | 6/2014 | Friesen et al. | | |
| 2014/0332213 A1* | 11/2014 | Zhou | ............... | C09K 8/685 |
| | | | | 166/280.2 |
| 2016/0298023 A1 | 10/2016 | Cadix et al. | | |
| 2018/0171203 A1 | 6/2018 | Cadix et al. | | |
| 2018/0171206 A1 | 6/2018 | Cadix et al. | | |

FOREIGN PATENT DOCUMENTS

| | | | | |
|---|---|---|---|---|
| CN | 104011101 A | 8/2014 | | |
| CN | 105143392 A | 12/2015 | | |
| RU | 2134702 C1 | 8/1999 | | |
| RU | 2377403 C2 | 12/2009 | | |
| WO | 199630421 | 10/1996 | | |
| WO | 199801478 | 1/1998 | | |
| WO | 199858974 | 12/1998 | | |
| WO | WO 1998/058974 | * 12/1998 | ............ | C08F 293/00 |
| WO | 199931144 | 6/1999 | | |
| WO | 199935177 | 7/1999 | | |
| WO | 199935178 | 7/1999 | | |
| WO | 200075207 A1 | 12/2000 | | |
| WO | 200142312 A1 | 6/2001 | | |
| WO | 200226836 A2 | 4/2002 | | |
| WO | 2003068827 A1 | 8/2003 | | |
| WO | 2003068848 A2 | 8/2003 | | |
| WO | 2005021612 A1 | 3/2005 | | |
| WO | 2012061147 A1 | 5/2012 | | |
| WO | 2013060741 A1 | 5/2013 | | |
| WO | WO2014167056 | * 10/2014 | ............ | C09K 8/68 |

* cited by examiner

*Primary Examiner* — Anuradha Ahuja
(74) *Attorney, Agent, or Firm* — Osha Bergman Watanabe & Burton LLP

(57) ABSTRACT

Polymeric systems useful for maintaining particle dispersions for extended periods of time.

21 Claims, No Drawings

POLYMERIC SYSTEMS FOR PARTICLE DISPERSION

CROSS-REFERENCE TO RELATED APPLICATION

The present application claims the benefit of priority under 35 U.S.C. § 119(e) of U.S. Provisional Application Ser. No. 62/427,246, filed on Nov. 29, 2016, the entire disclosure of which is incorporated herein by reference.

BACKGROUND

There exist many fields where the maintenance in suspension of particles is determining (particles of pigments in compositions of paint or varnish type, for example). More specifically, in the field of oil extraction, numerous stages are carried out by injecting fluids under pressure within subterranean formations, where it is often of use to keep particles in suspension in order to prevent them from sedimenting out in spite of the extreme temperature and pressure conditions generally employed in the subterranean formation.

For the purpose of inhibiting the phenomenon of separation by settling, it is possible to add additives which make it possible to keep the particles in suspension. A certain number of these additives have been described, which include in particular crosslinked or non-crosslinked polymers, polysaccharides and their derivatives, such as xanthan gum, cellulose ethers or alternatively guars, and its derivatives crosslinked with borate or zirconate. Nevertheless, it emerges that these suspending agents decompose when the temperature exceeds 150° C. This limitation thus renders these additives unusable for applications at a higher temperature (typically greater than 150° C., often between 150 and 200° C., indeed even ranging up to more than 200° C.). In addition, in the case of the use of these agents in the vicinity of oil-bearing rocks, namely in particular in fluids such as drill-in fluid, completion fluid, fracturing fluid, acidizing fluid or spacer fluids, they exhibit the disadvantage of decomposing in the form of insoluble residues which cannot be properly removed.

SUMMARY

The present disclosure provides polymeric systems useful for maintaining particle dispersions for extended periods of time. Polymeric systems are also useful for maintaining particle dispersions for extended periods of time at elevated temperatures and/or in high brine conditions. Also provided are dry polymeric systems that are able to undergo fast hydration.

In an embodiment, a method for fracturing a subterranean formation includes the step of injecting an aqueous fracturing fluid into at least a portion of the subterranean formation at pressures sufficient to fracture the formation, wherein the fracturing fluid comprises a polymer comprising:

at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof.

In another embodiment, a method of acidizing a subterranean formation penetrated by a wellbore includes the steps of:

(a) injecting into the wellbore at a pressure below subterranean formation fracturing pressure a treatment fluid having a first viscosity and comprising an aqueous acid and a polymer comprising:

at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof;

(b) forming at least one void in the subterranean formation with the treatment fluid; and (c) allowing the treatment fluid to attain a second viscosity that is greater than the first viscosity.

Also provided is an aqueous composition that includes water and a polymer comprising:

at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof, wherein the composition exhibits a particle suspension time of at least 1 hour.

In yet another embodiment, a powder composition includes polymer particles having particle size of from about 5 µm to about 400 µm and a molecular weight ranging from about 10,000 to 20,000,000, wherein the polymer includes acrylamide and 2-acrylamido-2-methylpropane sulfonic acid monomers and at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof.

DETAILED DESCRIPTION

The inventors have discovered polymeric systems for particle dispersions which, surprisingly, can be used in lower amounts in comparison with conventional carrier systems while providing enhanced particle dispersion capabilities. In an embodiment, an aqueous composition that includes water and a polymer of the present disclosure exhibits a particle suspension time of at least 1 hour. In another embodiment, the particle suspension time lasts at least 2 hours. In yet another embodiment, the particle suspension time lasts at least 4 hours. In another embodiment, the particle suspension time lasts over a period of 24 hours. In an embodiment, the aqueous composition suspends particles at a temperature of about 68° F. to about 350° F. (or any temperature within this range).

In an embodiment, the polymeric systems are utilized in connection with subterranean formations. In the present description, the notion of "subterranean formation" is understood in its broadest sense and includes both a rock containing hydrocarbons, in particular oil, and the various rock layers traversed in order to access this oil-bearing rock and to ensure the extraction of the hydrocarbons. Within the meaning of the present description, the notion of "rock" is used to denote any type of constituent material of a solid subterranean formation, whether or not the material constituting it is strictly speaking a rock. Thus, in particular, the expression "oil-bearing rock" is employed here as synonym for "oil-bearing reservoir" and denotes any subterranean formation containing hydrocarbons, in particular oil, whatever the nature of the material containing these hydrocarbons (rock or sand, for example).

Mention may in particular be made, among the fluids injected under pressure into subterranean formations, of the various fluids for completion and workover of the wells, in particular drilling fluids, whether they are used to access the oil-bearing rock or else to drill the reservoir itself ("drill-in"), or else fracturing fluids, or alternatively completion fluids, control or workover fluids or annular fluids or packer fluids or spacer fluids or acidizing fluids, or also fluids for cementing.

In an embodiment, the polymer includes at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts, and combinations thereof. In an embodiment, the hydrophilic monomers include acrylamide and 2-acrylamido-2-methylpropane sulfonic acid.

In an embodiment, the polymer includes hydrophilic monomers in a total amount from about 50 wt % to about 99.9 wt % of the polymer. In another embodiment, the polymer includes hydrophilic monomers in a total amount from about 80 wt % to about 99.9 wt % of the polymer. In another embodiment, the polymer includes hydrophobic monomers in a total amount from about 0.01 wt % to about 50 wt % of the polymer. In another embodiment, the polymer includes hydrophobic monomers in a total amount from about 0.01 wt % to about 20 wt % of the polymer.

In an embodiment, a terminal end position of the polymer includes a thiocarbonylthio functional group.

In an embodiment, the polymer is in a powder form having a particle size of from about 5 µm to about 400 µm. In another embodiment, the particle size ranges from about 50 µm to about 200 µm. In yet another embodiment, the polymer is in a slurry, which includes a solvent or hydrocarbon phase, and a suspension aiding agent, wherein the particle size of the polymer powder in the slurry ranges from about 5 µm to about 400 µm.

In another embodiment the polymer powder includes polymer particles having a particle size of from about 5 µm to about 400 µm and molecular weight from about 10,000 g/mol to about 20,000,000 g/mol, wherein the polymer includes acrylamide and 2-acrylamido-2-methylpropane sulfonic acid monomers and at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof. In an embodiment, the hydrophobic monomer is selected from lauryl (meth)acrylate, lauryl (meth)acrylamide, and combinations thereof.

In an embodiment, polymers of the present disclosure are prepared via micellar polymerization. The polymeric system includes sequential copolymers (P), which include at least one chain (C) of the type obtained by micellar polymerization, for keeping solid particles (p) in suspension in a fluid (F) where said chain (C) is soluble.

More specifically, according to particular aspect, a subject-matter of the present disclosure is the use of the abovementioned sequential copolymers as suspending agent in the fluid (F) injected under pressure into a subterranean formation where said fluid (F) includes at least a portion of the solid particles (p) and/or is brought into contact with at least a portion of the solid particles (p) within the subterranean formation subsequent to its injection.

Within the meaning of the present description, the term "chain soluble in the fluid (F)" is understood to mean a chain (C) which typically has a solubility at 20° C. of greater than or equal to 0.5% (5,000 ppm), preferably of greater than or equal to 1%, in the fluid (F).

Micellar polymerization consists schematically in carrying out a polymerization of hydrophilic monomers in a hydrophilic medium comprising micelles including hydrophobic monomers. Examples of micellar polymerization have in particular been described in U.S. Pat. No. 4,432,881 or else in Polymer, Vol. 36, No. 16, pp. 3197-3211 (1996), to which documents reference may be made for further details.

The chain (C) of the polymers (P) of use according to the invention is a chain which is soluble overall in the fluid (F) and which is predominantly formed of a series of hydrophilic units interrupted at different points by a plurality of hydrophobic sequences (B) of substantially identical size. The polymer of the present disclosure can be composed of the chain (C) or else can be a block copolymer where the chain (C) constitutes one of the blocks.

The hydrophobic sequences (B) are preferably polymer sequences which are insoluble in the fluid (F), typically having a solubility at 20° C. of less than or equal to 0.1% (1,000 ppm) in the fluid (F).

The copolymers (P) comprising the abovementioned chain (C) are suitable for keeping the solid particles (p) in suspension. They can be particles present within the subterranean formation and/or particles injected within the subterranean formation, typically jointly with the copolymers (such as, for example, proppant particles).

Use may typically be made, according to the invention, of a micellar polymerization, where the following are copolymerized (typically via the radical route) within an aqueous dispersing medium (typically water or a water/alcohol mixture): hydrophilic monomers in the dissolved or dispersed state in said medium; and hydrophobic monomers within surfactant micelles formed in said medium by introducing this surfactant therein at a concentration above its critical micelle concentration (cmc).

Preferably, the content of hydrophobic monomers corresponding to the ratio of the weight of the hydrophobic monomers with respect to the total weight of the hydrophobic and hydrophilic monomers is greater than or equal to 0.01%, preferably greater than 0.1%, indeed even greater than 0.2%, and less than or equal to 5%. Generally, the percentage of the hydrophobic units in the chain (C) is of the same order, typically greater than or equal to 0.05%, preferably greater than 0.1%, indeed even greater than 0.2%, and less than or equal to 5%.

In micellar polymerization, the hydrophobic monomers present in the micelles are said to be in "micellar solution". The micellar solution to which reference is made is a micro-heterogeneous system which is generally isotropic, optically transparent and thermodynamically stable.

It should be noted that a micellar solution of the type employed in micellar polymerization should be distinguished from a microemulsion. In particular, in contrast to a microemulsion, a micellar solution is formed at any concentration exceeding the critical micelle concentration of the surfactant employed, with the sole condition that the hydrophobic monomer be soluble at least to a certain extent within the internal space of the micelles. A micellar solution furthermore differs from an emulsion in the absence of homogeneous internal phase: the micelles contain a very small number of molecules (typically less than 1000, generally less than 500 and typically from 1 to 100, with most often 1 to 50, monomers, and at most a few hundred surfactant molecules, when a surfactant is present) and the micellar solution generally has physical properties similar to those of the monomer-free surfactant micelles. Moreover, generally, a micellar solution is transparent with respect to visible light, given the small size of the micelles, which does not result in refraction phenomena, unlike the drops of an emulsion, which refract light and give it its characteristic cloudy or white appearance.

The micellar polymerization technique results in characteristic sequential polymers which each comprise several hydrophobic blocks of substantially the same size and where this size can be controlled. Specifically, given the confinement of the hydrophobic monomers within the micelles, each of the hydrophobic blocks comprises substantially one and the same defined number $n_H$ of hydrophobic monomers, it being possible for this number $n_H$ to be calculated as follows (Macromolecular Chem. Physics, 202, 8, 1384-1397, 2001):

$$n_H = N_{agg} \cdot [M_H]/([\text{surfactant}] - \text{cmc})$$

where:

$N_{agg}$ is the aggregation number of the surfactant, which reflects the surfactant number present in each micelle;

$[M_H]$ is the molar concentration of hydrophobic monomer in the medium;

[surfactant] is the molar concentration of surfactant in the medium; and cmc is the critical micelle (molar) concentration.

The micellar polymerization technique thus makes possible advantageous control of the hydrophobic units introduced into the polymers formed, namely: overall control of the molar fraction of hydrophobic units in the polymer (by adjusting the ratio of the concentrations of the two monomers); and more specific control of the number of hydrophobic units present in each of the hydrophobic blocks (by modifying the parameters influencing the $n_H$ defined above).

The chain (C) overall soluble in the fluid (F), which is obtained by micellar polymerization, comprises:

a hydrophilic component, composed of the hydrophilic monomers, which corresponds to a hydrophilic polymer chain which would have a solubility typically of greater than or equal to 1% (10,000 ppm) at 20° C. if it were introduced alone into the fluid (F), a hydrophobic component, composed of the hydrophobic sequences, each having a solubility typically of less than or equal to 0.1% (1000 ppm) at 20° C. in the fluid (F).

In many cases, the chain (C) can be described as a hydrophilic chain having the abovementioned solubility (at least 1%) to which pendant hydrophobic groups are grafted. In particular in this case, the chain (C) has overall a solubility at 20° C. in the fluid (F) which preferably remains greater than or equal to 0.1%, indeed even 0.5%.

According to a specific embodiment, the chain (C) is of the type obtained by a process comprising a stage (e) of micellar radical polymerization in which the following are brought into contact, within an aqueous medium (M):

hydrophilic monomers, dissolved or dispersed in said aqueous medium (M) (typically water or a water/alcohol mixture);

hydrophobic monomers in the form of a micellar solution, namely a solution containing, in the dispersed state within the medium (M), micelles comprising these hydrophobic monomers (it being possible in particular for this dispersed state to be obtained using at least one surfactant); and at least one radical polymerization initiator, this initiator typically being water-soluble or water-dispersible.

According to a preferred embodiment, the chain (C) is of the type obtained by a process comprising a stage (E) of micellar radical polymerization in which the following are brought into contact, within an aqueous medium (M):

hydrophilic monomers, dissolved or dispersed in said aqueous medium (M) (typically water or a water/alcohol mixture);

hydrophobic monomers in the form of a micellar solution, namely a solution containing, in the dispersed state within the medium (M), micelles comprising these hydrophobic monomers (it being possible in particular for this dispersed state to be obtained using at least one surfactant);

at least one radical polymerization initiator, this initiator typically being water-soluble or water-dispersible; and at least one radical polymerization control agent.

Stage (E) is similar to the abovementioned stage (e) but employs an additional control agent. This stage, known under the name of "controlled-nature micellar radical polymerization", has in particular been described in WO 2013/060741. All the alternative forms described in this document can be used here.

Within the meaning of the present description, the term "radical polymerization control agent" is understood to mean a compound which is capable of extending the lifetime of the growing polymer chains in a polymerization reaction and of conferring, on the polymerization, a living or controlled nature. This control agent is typically a reversible transfer agent as employed in controlled radical polymerizations denoted under the terminology RAFT or MADIX, which typically employ a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

In an embodiment, the radical polymerization control agent employed in stage (E) is a compound which comprises a thiocarbonylthio —S(C=S)— group. Thus, for example, it can be a compound which comprises a xanthate group (carrying —SC=S—O— functional groups), for example a xanthate. Other types of control agent can be envisaged (for example of the type of those employed in CRP or in ATRP).

According to a specific embodiment, the control agent employed in stage (E) can be a polymer chain resulting from a controlled radical polymerization and carrying a group which is capable of controlling a radical polymerization (polymer chain of "living" type, which is a type well known per se). Thus, for example, the control agent can be a polymer chain (preferably hydrophilic or water-dispersible) functionalized at the chain end with a xanthate group or more generally comprising an —SC=S— group, for example obtained according to the MADIX technology.

Alternatively, the control agent employed in stage (E) is a non-polymeric compound carrying a group which ensures the control of the radical polymerization, in particular a thiocarbonylthio —S(C=S)— group.

According to a specific alternative form, the radical polymerization control agent employed in stage (E) is a polymer, advantageously an oligomer, having a water-soluble or water-dispersible nature and carrying a thiocarbonylthio —S(C=S)— group, for example a xanthate —SC=S—O— group. This polymer, which is capable of acting both as control agent for the polymerization and as monomer in stage (E), is also denoted by "prepolymer" in the continuation of the description. Typically, this prepolymer is obtained by radical polymerization of hydrophilic monomers in the presence of a control agent carrying a thiocarbonylthio —S(C=S)— group, for example a xanthate. Thus, for example, according to an advantageous embodiment which is illustrated at the end of the present description, the control agent employed in stage (E) can advantageously be a prepolymer carrying a thiocarbonylthio —S(C=S)— group, for example a xanthate —SC=S—O— group, obtained on conclusion of a stage ($E^0$) of controlled radical polymerization prior to stage (E). In this stage ($E^0$), hydrophilic monomers, advantageously identical to those employed in stage (E); a radical polymerization initiator and a control agent carrying a thiocarbonylthio —S(C=S)— group, for example a xanthate, can typically be brought into contact.

The use of the abovementioned stage ($E^0$) prior to stage (E) makes it possible, schematically, to hydrophilize a large number of control agents carrying thiocarbonylthio functional groups (for example xanthates, which are rather hydrophobic by nature), by converting them from prepolymers which are soluble or dispersible in the medium (M) of stage (E). Preferably, a prepolymer synthesized in stage ($E^0$) has a short polymer chain, for example comprising a series of less than 50 monomer units, indeed even less than 25 monomer units, for example between 2 and 15 monomer units.

When stage (E) is employed, the polymers according to the invention comprise chains (C) which have a "controlled" structure, namely that all the chains (C) present on the polymers have substantially the same size and the same structure. The chains (C) comprise in particular the blocks (B) substantially in the same number and proportion.

The specific polymers (P) employed in the context of the present invention, due to the presence of the hydrophobic sequences in a hydrophilic polymer chain, turn out to provide a control effect on the fluid which is particularly effective: without wishing to be committed to a theory, it appears that the hydrophobic units within a hydrophilic chain and/or different hydrophilic chains have a tendency to associate with one another.

In an embodiment, the injected fluid (F) includes the polymers (P) but does not include solid particles (p), and it encounters said particles (p) within the subterranean formation subsequent to its injection. The association between particles and polymers then takes place in situ. Such a fluid can, for example, be injected during a drilling operation, and the rock cuttings formed during the drilling then perform the role of the particles (p) in situ.

According to an alternative variant, the injected fluid (F) comprises, before the injection, at least a portion and generally all of the particles (p) associated with the polymer (P), it being understood that it can optionally encounter other particles (p) within the subterranean formation.

Two forms can in particular be envisaged in this context:

Form 1: the polymers (P) and the particles (p) are mixed during the formulation of the fluid (F), on the site of operation or upstream, typically by adding the particles (p), in the dry state or optionally in the dispersed state, to a composition comprising the polymers (P) in solution.

Form 2: the fluid (F) is manufactured, advantageously on the site of operation, from a composition (premix) prepared upstream (hereinafter denoted by the term "blend") comprising the polymers (P) and at least a portion of the particles (p), generally within a dispersing liquid. In order to form the fluid (F), this blend is mixed with the other constituents of the fluid (F).

In some embodiments, the polymers (P) associated with the particles (p) can be employed as dispersing and stabilizing agent for the dispersion of the particles (p), at the same time providing an effect of agent for control of fluid loss.

The notion of "control of fluid loss" refers here to the inhibition of the effect of "fluid loss" observed when a fluid is injected under pressure within a subterranean formation: the liquid present in the fluid has a tendency to penetrate into the constituent rock of the subterranean formation, which can damage the well, indeed even harm its integrity. When these fluids employed under pressure contain insoluble compounds (which is very often the case, in particular for oil cement grouts or else drilling or fracturing fluids), the effect of fluid loss at the same time brings about risks of loss of control of the fluids injected an increase in the concentration of insoluble compounds of the fluid, which can result in an increase in viscosity, which affects the mobility of the fluid.

In particular when the fluid (F) is a fracturing, cementing or drilling fluid, the presence of the copolymers (P) makes it possible to obtain control of fluid loss by limiting, indeed even completely inhibiting, the escape of the fluid (F), typically water or an aqueous composition, into the subterranean formation where the extraction is carried out.

Various specific advantages and embodiments of the invention will now be described in more detail.

THE FLUID (F). The term "fluid" is understood to mean, within the meaning of the description, any homogeneous or non-homogeneous medium comprising a liquid or viscous vector which optionally transports a liquid or gelled dispersed phase and/or solid particles, said medium being overall pumpable by means of the devices for injection under pressure used in the application under consideration.

The term "liquid or viscous vector" of the fluid (F) is understood to mean the fluid itself, or else the solvent, in the case where the fluid comprises dissolved compounds, and/or the continuous phase, in the case where the fluid comprises dispersed elements (droplets of liquid or gelled dispersed phase, solid particles, and the like).

According to a highly suitable embodiment, the fluid (F) is an aqueous fluid. The term "aqueous" is understood here to mean that the fluid comprises water as liquid or viscous vector, either as sole constituent of the liquid or viscous vector or in combination with other water-soluble solvents.

In the case of the presence of solvents other than water in the liquid or viscous vector of the fluid (F), the water advantageously remains the predominant solvent within the liquid or viscous vector, advantageously present in a proportion of at least 50% by weight, indeed even of at least 75% by weight, with respect to the total weight of the solvents in the liquid or viscous vector.

In an embodiment, the fluid (F) is selected from fresh water, sea water, brines, salt water, produced water, recycled water, industrial waste water, waste water associated with oil production, and combinations thereof.

THE PARTICLES (p). The notion of "particle" within the meaning under which it is employed in the present description is not confined to that of individual particles. It more generally denotes solid entities which can be dispersed within a fluid, in the form of objects (individual particles, aggregates, and the like) for which all the dimensions are less than 5 mm, preferably less than 2 mm, for example less than 1 mm.

The particles (p) according to the invention can be chosen from: calcium carbonate or cement, silica or sand, ceramic, clay, barite, hematite, carbon black and/or their mixtures.

According to a specific embodiment of the invention, the particles (p) are sands or cement particles.

The Polymers (P).

Hydrophilic monomers. The chain (C) can typically comprise monomers chosen from:

carboxylic acids which are ethylenically unsaturated, sulfonic acids and phosphonic acids, and/or its derivatives, such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising from 1 to 3 and preferably from 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 1-allyloxy-2-hydroylpropyl sulfonate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;

esters of α,β-ethylenically unsaturated mono- and dicarboxylic acids with $C_2$-$C_3$ alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;

α,β-ethylenically unsaturated monocarboxylic acid amides and their N-alkyl and N,N-dialkyl derivatives, such as acrylamide, methacrylamide, N-methyl(meth)acrylamide, N-ethyl(meth)acrylamide, N-isopropyl(meth)acrylamide, N,N-dimethyl(meth)acrylamide, N,N-diethyl(meth)acrylamide, morpholinyl(meth)acrylamide, and methylolacrylamide (acrylamide and N,N-dimethyl(meth)acrylamide prove to be in particular advantageous);

N-vinyllactams and its derivatives, for example N-vinylpyrrolidone or N-vinylpiperidone;

open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated mono- and dicarboxylic acids with aminoalcohols, for example N,N-dimethylaminomethyl (meth)acrylate, N,N-dimethylaminoethyl (meth)acrylate, N,N-diethylamino ethyl acrylate and N,N-dimethylaminopropyl (meth)acrylate;

amides of α,β-ethylenically unsaturated mono- and dicarboxylic acids with diamines comprising at least one primary or secondary amino group, such as N-[2-(dimethylamino)ethyl]acrylamide, N-[2-(dimethylamino)ethyl]methacrylamide, N-[3-(dimethylamino)propyl]acrylamide, N[3-(dimethylamino)propyl]methacrylamide, N-[4-(dimethylamino)butyl]acrylamide and N[4-(dimethylamino)butyl]methacrylamide;

N-diallylamines, N,N-diallyl-N-alkylamines, their acid addition salts and their quaternization products, the alkyl employed here preferably being $C_1$-$C_3$ alkyl;

N,N-diallyl-N-methylamine and N,N-diallyl-N,N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and their salts;

sulfobetaines; and the salts of the abovementioned monomers;

the mixtures and combinations of two or more of the monomers and/or their salts mentioned above.

According to a specific embodiment, these monomers can in particular comprise acrylic acid (AA).

According to another embodiment, the hydrophilic monomers of the chain (C) comprise (and typically consist of) (meth)acrylamide monomers, or more generally (meth)acrylamido monomers, including:

acrylamido monomers, namely acrylamide (Am), dimethylacrylamide (DMA), its sulfonate derivative, in particular acrylamidomethylpropanesulfonic acids (AMPS);

the quaternary ammonium APTAC and sulfopropyldimethylammoniopropylacrylamide;

methacrylamido monomers, such as sulfopropyldimethylammoniopropylmethacrylamide (SPP) or sulfohydroxypropyldimethylammoniopropylmethacrylamide.

According to a specific embodiment, the hydrophilic monomers of the chain (C) are acrylamides. An acrylamide is preferably an acrylamide which is not stabilized with copper.

According to a specific embodiment, the hydrophilic monomers of the chain (C) are chosen from acrylamides, dimethylacrylamides (DMA), acrylamidomethylpropanesulfonic acids (AMPS), acrylic acids (AA), their salts and their mixtures.

According to a specific embodiment, the hydrophilic monomers of the chain (C) can typically have a polymerizable functional group of acrylamido type and a side chain composed of ethylene oxide or propylene oxide strings, or else based on N-isopropylacrylamide or N-vinylcaprolactam.

Hydrophobic monomers. Mention may in particular be made, as nonlimiting examples of hydrophobic monomer constituting the insoluble blocks which can be used according to the invention, of:

vinylaromatic monomers, such as styrene, a-methylstyrene, para-chloromethyl styrene, vinyltoluene, 2-methyl styrene, 4-methyl styrene, 2-(n-butyl)styrene, 4-(n-decyl)styrene or tert-butyl styrene;

halogenated vinyl compounds, such as vinyl or vinylidene halides, for example vinyl or vinylidene chlorides or fluorides, corresponding to the formula $R_bR_cC=CX^1X^2$, where: $X^1$=F or Cl $X^2$=H, F or Cl each one of $R_b$ and $R_c$ represents, independently:

H, Cl, F; or an alkyl group, preferably chlorinated and/or fluorinated, more advantageously perchlorinated or perfluorinated;

esters of α,β-ethylenically unsaturated mono- or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate, cetyl (meth)acrylate, erucyl (meth)acrylate, and their mixtures;

esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate, vinyl versatate and their mixtures;

ethylenically unsaturated nitriles, such as acrylonitrile, methacrylonitrile and their mixtures;

esters of α,β-ethylenically unsaturated mono- and dicarboxylic acids with $C_3$-$C_{30}$ alkanediols, for example 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate, and the like;

primary amides of α,β-ethylenically unsaturated mono- and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-butylphenylacrylamide, N-methyl-N-hexylacrylamide, N,N-dihexylacrylamide, hexyl(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linoleyl(meth)acrylamide, N-linolenyl(meth)acrylamide, N-stearyl(meth)acrylamide and N-lauryl(meth)acrylamide;

N-vinyllactams and its derivatives, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam, and the like;

esters of α,β-ethylenically unsaturated mono- and dicarboxylic acids with aminoalcohols, for example N,N-dimethylaminocyclohexyl (meth)acrylate;

amides of α,β-ethylenically unsaturated mono- and dicarboxylic acids with diamines comprising at least one primary or secondary amino group, for example N-[4-(dimethylamino)butyl]acrylamide, N[4-(dimethylamino)butyl]methacrylamide, N-[2-(dimethylamino)ethyl]acrylamide, N-[4-(dimethylamino)cyclohexyl]acrylamide, N-[4-(dimethylamino)cyclohexyl]methacrylamide, and the like; and monoolefins ($C_2$-$C_8$) and nonaromatic hydrocarbons comprising at least two conjugated double bonds, for example ethylene, propylene, isobutylene, isoprene, butadiene, and the like.

According to a preferred embodiment, the hydrophobic monomers employed according to the invention can be chosen from:

$C_1$-$C_{30}$ alkyl and preferably $C_4$-$C_{22}$ alkyl α,β-unsaturated esters, in particular alkyl acrylates and methacrylates, such as methyl, ethyl, butyl, 2-ethylhexyl, isooctyl, lauryl, isodecyl, stearyl, octyl, myristyl, pentadecyl, cetyl, oleyl or erucyl acrylates and methacrylates (lauryl methacrylate in particular proves to be especially advantageous);

$C_1$-$C_{30}$ alkyl and preferably $C_4$-$C_{22}$ alkyl α,β-unsaturated amides, in particular alkylacrylamides and alkylmethacrylamides, such as methyl-, ethyl-, butyl-, 2-ethylhexyl-, isooctyl-, lauryl-, isodecyl-, stearyl-, octyl-, myristyl-, pentadecyl-, cetyl-, oleyl- or erucylacrylamide or -methacrylamide (laurylmethacrylamide in particular proves to be especially advantageous);

vinyl or allyl alcohol esters of saturated carboxylic acids, such as vinyl or allyl acetate, propionate, versatate or stearate;

α,β-unsaturated nitriles comprising from 3 to 12 carbon atoms, such as acrylonitrile or methacrylonitrile; α-olefins and conjugated dienes; vinylaromatic monomers, such as styrene, α-methylstyrene, para-chloromethylstyrene, vinyltoluene, 2-methylstyrene, 4-methylstyrene, 2-(n-butyl)styrene, 4-(n-decyl)styrene or tert-butylstyrene; the mixtures and combinations of two or more of the abovementioned monomers.

According to an advantageous embodiment, in particular when the fluid (F) is a fracturing fluid, use may be made of hydrophobic monomers which bond feebly to the chain (C). This makes it possible, if necessary, to remove the polymers introduced within the subterranean formation (in view of their amphiphilic nature, the polymers of the invention generally have a self-associative nature and tend to form gels which are difficult to remove; under the effect in particular of the temperature and/or the pH, it is possible to cleave the hydrophobic monomers if they are not bonded excessively strongly to the polymer, which makes possible removal from the fluid). Hydrophobic monomers suited to this embodiment are in particular the abovementioned esters.

It should be noted that, when other monomers are used, removal from the fluids is still possible by a technique known per se, where "breakers", such as oxidizing agents, are added. The preceding embodiment makes it possible to dispense with the use of such "breakers", which is reflected in particular in terms of decrease in cost. In an embodiment, the breaker is selected from peroxides, persulfates, peracids, bromates, chlorates, chlorites, and combinations thereof.

According to a specific embodiment, the polymer can exhibit a molecular weight of from about 10,000 g/mol to about 20,000,000 g/mol. In another embodiment, the molecular weight of the polymer ranges from about 100,000 g/mol to about 10,000,000 g/mol. In another embodiment, the molecular weight of the polymer ranges from about 500,000 g/mol to about 5,000,000 g/mol.

THE RADICAL POLYMERIZATION AGENT. The control agent employed in stage (E) or, if appropriate, in stage ($E^0$) of the process of the invention is advantageously a compound carrying a thiocarbonylthio —S(C=S)— group. According to a specific embodiment, the control agent can carry several thiocarbonylthio groups. It can optionally be a polymer chain carrying such a group.

Thus, this control agent can, for example, correspond to the formula (A) below:

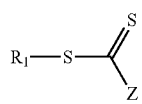

(A)

in which Z represents: a hydrogen atom, a chlorine atom, an optionally substituted alkyl or optionally substituted aryl radical, an optionally substituted heterocycle, an optionally substituted alkylthio radical, an optionally substituted arylthio radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acyloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain, and $R_1$ represents an optionally substituted alkyl, acyl, aryl, aralkyl, alkenyl or alkynyl group, a saturated or unsaturated, aromatic, optionally substituted carbocycle or heterocycle, or a polymer chain, which is preferably hydrophilic or water-dispersible when the agent is employed in stage (E).

The $R_1$ or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—$O_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups exhibiting a hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

For the control agents of formula (A) employed in stage (E), it is generally preferred for the $R_1$ group to be of hydrophilic nature. Advantageously, it is a water-soluble or water-dispersible polymer chain.

The $R_1$ group can alternatively be amphiphilic, namely exhibit both a hydrophilic and a lipophilic nature. It is preferable for $R_1$ not to be hydrophobic.

As regards the control agents of formula (A) employed in stage ($E^0$), $R_1$ can typically be a substituted or unsubstituted, preferably substituted, alkyl group. A control agent of formula (A) employed in stage ($E^0$) can nevertheless comprise other types of $R_1$ groups, in particular a ring or a polymer chain.

The optionally substituted alkyl, acyl, aryl, aralkyl or alkynyl groups generally exhibit from 1 to 20 carbon atoms, preferably from 1 to 12 and more preferably from 1 to 9 carbon atoms. They can be linear or branched. They can also be substituted by oxygen atoms, in particular in the form of esters, sulfur atoms or nitrogen atoms.

Mention may in particular be made, among the alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain can result from a radical or ionic polymerization or from a polycondensation.

Advantageously, use is made, as control agent for stage (E) and also for stage ($E^0$), if appropriate, of compounds carrying a xanthate —S(C=S)O—, trithiocarbonate, dithiocarbamate or dithiocarbazate functional group, for example carrying an O-ethyl xanthate functional group of formula —S(C=S)OCH$_2$CH$_3$.

When stage ($E^0$) is carried out, it is in particular advantageous to employ, as control agents in this stage, a compound chosen from xanthates, trithiocarbonates, dithiocarbamates and dithiocarbazates. Xanthates prove to be very particularly advantageous, in particular those carrying an O-ethyl xanthate —S(C=S)OCH$_2$CH$_3$ functional group, such as O-ethyl S-(1-(methoxycarbonyl)ethyl) xanthate (CH$_3$CH(CO$_2$CH$_3$))S(C=S)OEt. Another possible control agent in stage ($E^0$) is dibenzyl trithiocarbonate of formula PhCH$_2$S(C=S)SCH$_2$Ph (where Ph=phenyl).

The living prepolymers obtained in step ($E^0$) by using the abovementioned control agents prove to be particularly advantageous for carrying out stage (E).

Initiation and Implementation of the Radical Polymerizations of Stages (E) and ($E^0$). When it is employed in stage (E), the radical polymerization initiator is preferably water-soluble or water-dispersible. Apart from this preferential condition, any radical polymerization initiator (source of free radicals) known per se and suited to the conditions chosen for these stages can be employed in stage (E) and stage ($E^0$) of the process of the invention.

Thus, the radical polymerization initiator employed according to the invention can, for example, be chosen from the initiators conventionally used in radical polymerization. It can, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl- N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide] or 2,2'-azobis(isobutyramide) dihydrate, redox systems comprising combinations, such as:

mixtures of hydrogen peroxide, alkyl peroxide, peresters, percarbonates and the like and any iron salt, titanous salt, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

Typically, the amount of initiator to be used is preferably determined so that the amount of radicals generated is at most 50 mo; % and preferably at most 20 mo; %, with respect to the amount of control or transfer agent.

Very particularly in stage (E), it generally proves to be advantageous to use a radical initiator of redox type, which exhibits, inter alia, the advantage of not requiring heating of the reaction medium (no thermal initiation), and the inventors of which have in addition now discovered that it proves to be suitable for the micellar polymerization of stage (E).

Thus, the radical polymerization initiator employed in stage (E) can typically be a redox initiator, typically not requiring heating for its thermal initiation. It is typically a mixture of at least one oxidizing agent with at least one reducing agent.

The oxidizing agent present in this redox system is preferably a water-soluble agent. This oxidizing agent can, for example, be chosen from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent can typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:

mixtures of water-soluble persulfates with water-soluble tertiary amines, mixtures of water-soluble bromates (for example, alkali metal bromates) with water-soluble sulfites (for example, alkali metal sulfites), mixtures of hydrogen peroxide, alkyl peroxide, peresters, percarbonates and the like and any iron salt, titanous salt, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

An advantageous redox system comprises (and preferably consists of) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of stage (E) to be devoid of copper. In the case of the presence of copper, it is generally desirable to add a copper-complexing agent, such as EDTA, in an amount capable of masking its presence.

Whatever the nature of the initiator employed, the radical polymerization of stage ($E^0$) can be carried out in any appropriate physical form, for example in solution in water or in a solvent, for example an alcohol or THF, in emulsion in water ("latex" process) or in bulk, if appropriate while controlling the temperature and/or the pH in order to render entities liquid and/or soluble or insoluble.

After carrying out stage (E), given the specific use of a control agent, polymers functionalized with transfer groups (living polymers) are obtained. This living character makes it possible, if desired, to employ these polymers in a subsequent polymerization reaction, according to a technique well known per se. Alternatively, if required, it is possible to deactivate or to destroy the transfer groups, for example by hydrolysis, ozonolysis or reaction with amines, according to means known per se. Thus, according to a specific embodiment, the process of the invention can comprise, after stage (E), a stage (E1) of hydrolysis, of ozonolysis or of reaction with amines which is capable of deactivating and/or destroying all or a portion of the transfer groups present on the polymer prepared in stage (E).

Surfactants. Use may be made, in order to prepare the micellar solution of the hydrophobic monomers which are employed in stage (E), of any suitable surfactant in a nonlimiting manner; use may be made, for example, of the surfactants chosen from the following list:

Anionic surfactants can be chosen from:

alkyl ester sulfonates, for example of formula R—CH($SO_3M$)-$CH_2COOR'$, or alkyl ester sulfates, for example of formula R—CH($OSO_3M$)-$CH_2COOR'$, where R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal cation, for example the sodium cation, or the ammonium cation. Mention may very particularly be made of methyl ester sulfonates, the R radical of which is a $C_{14}$-$C_{16}$ radical;

alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;

alkyl sulfates, for example of formula $ROSO_3M$, where R represents a $C_{10}$-$C_{24}$ and preferably $C_{12}$-$C_{20}$ alkyl or hydroxyalkyl radical and M represents a cation with the same definition as above;

alkyl ether sulfates, for example of formula $RO(OA)_nSO_3M$, where R represents a $C_{10}$-$C_{24}$ and preferably $C_{12}$-$C_{20}$ alkyl or hydroxyalkyl radical, OA represents an ethoxylated and/or propoxylated group, M represents a cation with the same definition as above and n generally varies from 1 to 4, such as, for example, lauryl ether sulfate with n=2;

alkylamide sulfates, for example of formula $RCONHR'OSO_3M$, where R represents a $C_2$-$C_{22}$ and preferably $C_6$-$C_{20}$ alkyl radical, R' represents a $C_2$-$C_3$ alkyl radical and M represents a cation with the same definition as above, and also their polyalkoxylated (ethoxylated and/or propoxylated) derivatives (alkylamide ether sulfates);

salts of saturated or unsaturated fatty acids, for example such as $C_8$-$C_{24}$ and preferably $C_{14}$-$C_{20}$ acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;

monoester and diester phosphates, for example having the following formula: $(RO)_x$—$P(=O)(OM)_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline earth metal cation;

Nonionic surfactants can be chosen from:

alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide with the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example $C_8$-$C_{20}$ fatty acid amides, in particular fatty acid monoalkanolamides, for example cocamide MEA or cocamide MIPA;

Amphoteric surfactants (true amphoteric entities comprising an ionic group and a potentially ionic group of opposite charge, or zwitterionic entities simultaneously comprising two opposite charges) can be:

betaines generally, in particular carboxybetaines, for example lauryl betaine (Mirataine BB from Rhodia) or octyl betaine or coco betaine (Mirataine BB-FLA from Rhodia); amidoalkyl betaines, such as cocamidopropyl betaine (CAPB) (Mirataine BDJ from Rhodia or Mirataine BET C-30 from Rhodia);

sulfobetaines or sultaines, such as cocamidopropyl hydroxysultaine (Mirataine CBS from Rhodia);

alkylamphoacetates and alkylamphodiacetates, such as, for example, comprising a cocoyl or lauryl chain (Miranol C2M Conc. NP, C32, L32 in particular, from Rhodia);

alkylamphopropionates or alkylamphodipropionates (Miranol C2M SF);

alkyl amphohydroxypropyl sultaines (Miranol CS);

alkylamine oxides, for example lauramine oxide (INCI);

Cationic surfactants can be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides having a cationic nature. An example of a cationic surfactant is cetrimonium chloride or bromide (INCI);

the surfactants employed according to the present invention can be block copolymers comprising at least one hydrophilic block and at least one hydrophobic block different from the hydrophilic block, which are advantageously obtained according to a polymerization process where:

($a_0$) at least one hydrophilic (respectively hydrophobic) monomer, at least one source of free radicals and at least one radical polymerization control agent of the —S(C=S)— type are brought together within an aqueous phase;

($a_1$) the polymer obtained on conclusion of stage ($a_0$) is brought into contact with at least one hydrophobic (respectively hydrophilic) monomer different from the monomer employed in stage ($a_0$) and at least one source of free radicals; via which a diblock copolymer is obtained.

Polymers of the triblock type, or comprising more blocks, can optionally be obtained by carrying out, after stage ($a_1$), a stage ($a_2$) in which the polymer obtained on conclusion of stage ($a_1$) is brought into contact with at least one monomer different from the monomer employed in stage ($a_1$) and at least one source of free radicals; and more generally by carrying out (n+1) stages of the type of the abovementioned stages ($a_1$) and ($a_2$) and n is an integer typically ranging from 1 to 3, where, in each stage ($a_n$), with n≥1, the polymer obtained on conclusion of stage ($a_{n-1}$) is brought into contact with at least one monomer different from the monomer employed in stage ($a_{n-1}$) and at least one source of free radicals. Use may be made, for example, according to the invention, of the copolymers of the type which are described in WO03068827, WO03068848 and WO2005/021612.

In an embodiment, one or more polymers of the present disclosure are present in an aqueous composition. In another embodiment, one or more polymers of the present disclosure are present in an aqueous composition in an amount ranging from about 0.001 wt % to about 10 wt % based upon the total weight of the aqueous composition.

In an embodiment, hydration rate of the powder polymers of the present disclosure is increased at low shear mixing (for example, less than 10,000 rpm). In an embodiment, dry polymer is combined with mineral oil before adding to water. In another embodiment, dry polymer is pre-treated or post-treated with a solvent (e.g. mutual solvent) before addition to water. In yet another embodiment, a hydrating surfactant is incorporated during polymer manufacture. In another embodiment, examples of hydrating surfactants include, but are not limited to, EO/PO copolymers, e.g., ANTAROX 31R1, ANTAROX LA EP 16 and ANTAROX BL 225. In another embodiment, examples of solvents include, but are not limited to, ethylene glycol, propylene glycol, ethylene glycol monobutyl ether (EGMBE), and "green" solvents, e.g. RHODISOLV DIB.

The present disclosure also provides methods for utilizing the present polymers and related compositions.

In an embodiment, a method for fracturing a subterranean formation includes the step of injecting an aqueous fracturing fluid into at least a portion of the subterranean formation at pressures sufficient to fracture the formation, wherein the fracturing fluid includes a polymer of the present disclosure. In an embodiment the polymer includes: at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof.

In an embodiment, prior to injecting the aqueous fracturing fluid, the polymer is in a powder form with a particle size of from about 5 μm to about 400 μm. In an embodiment, the polymer is present in an amount ranging from about 0.001 wt % to about 10 wt % based upon the total weight of the fracturing fluid.

In an embodiment, the fracturing fluid suspends particles at a temperature from about 68° F. to about 350° F. In another embodiment, the fracturing fluid suspends particles at a temperature from about 250° F. to about 350° F. In another embodiment, the fracturing fluid suspends particles at a temperature from about 300° F. to about 350° F.

In an embodiment, the fracturing fluid further includes a surfactant. In an embodiment, the surfactant is selected from, but not limited to, tridecyl alcohol ethoxylate and EO/PO block copolymers (e.g. ANTAROX 31R1, ANTAROX LA EP 16, ANTAROX BL 225). In an embodiment, the surfactant is present in an amount ranging from about 0.01 wt % to about 10 wt % based upon the weight of the polymer.

In an embodiment, the fracturing fluid further includes a proppant. In an embodiment, the proppant is used in an amount ranging from about 20 wt % to about 60 wt % based upon the total weight of the fracturing fluid.

In an embodiment, the fracturing fluid further includes a clay stabilizer. In an embodiment, the clay stabilizer is selected from choline chloride, potassium chloride, ammonium chloride, sodium chloride, calcium chloride, and combinations thereof. In an embodiment, the clay stabilizer is present in an amount ranging from about 0.01 wt % to about 30 wt % based upon the total weight of the fracturing fluid.

In an embodiment, the method further includes the step of injecting a breaker into at least a portion of the subterranean formation.

In an embodiment, the fracturing fluid is selected from fresh water, sea water, brines, salt water, produced water, recycled water, industrial waste water, waste water associated with oil production, and combinations thereof.

In another embodiment, a fracturing fluid is provided, which includes a polymer in a mass concentration of from about 0.1 ppt to about 200 ppt, based upon total volume of the composition, a plurality of proppant particles in a mass concentration of from about 0.1 lb/gal to about 12 lb/gal, based upon total volume of the composition, and a breaker present in a mass concentration of from 0 ppt to about 20 ppt based upon total volume of the composition.

Also provided is a method of acidizing a formation penetrated by a wellbore that includes the steps of injecting into the wellbore at a pressure below formation fracturing pressure a treatment fluid that includes a polymer according to the present disclosure and an aqueous acid and allowing the treatment fluid to acidize the formation and/or self-divert into the formation. As used herein, the term, "self-divert" refers to a composition that viscosifies as it stimulates the formation and, in so doing, diverts any remaining acid into zones of lower permeability in the formation.

In an embodiment, a method of acidizing a subterranean formation penetrated by a wellbore includes the steps of: (a) injecting into the wellbore at a pressure below subterranean formation fracturing pressure a treatment fluid having a first viscosity and including an aqueous acid and a polymer which includes: at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof; (b) forming at least one void in the subterranean formation with the treatment fluid; and (c) allowing the treatment fluid to attain a second viscosity that is greater than the first viscosity.

In an embodiment, the method further includes forming at least one void in the subterranean formation with the treatment fluid after the fluid has attained the second viscosity.

In another embodiment, the method further includes reducing the viscosity of the treatment fluid to a viscosity that is less than the second viscosity.

Optionally, the treatment fluid further includes one or more additives. In an embodiment, the fluid includes one or more additives selected from corrosion inhibitors, iron control agents, clay stabilizers, calcium sulfate inhibitors, scale inhibitors, mutual solvents, non-emulsifiers, anti-slug agents and combinations thereof. In an embodiment, the corrosion inhibitor is selected from alcohols (e.g. acetylenics); cationics (e.g. quaternary ammonium salts, imidazolines, and alkyl pyridines); and nonionics (e.g. alcohol ethoxylates).

Suitable aqueous acids include those compatible with the polymers of the present disclosure for use in an acidizing process. In an embodiment, the aqueous acid is selected from hydrochloric acid, hydrofluoric acid, formic acid, acetic acid, sulfamic acid, and combinations thereof. In an embodiment, the treatment fluid includes acid in an amount up to 30 wt % by total weight of the fluid.

Compositions of the present disclosure can also be used to limit or prevent pump damage during surface transport of proppant. In surface transport, proppant (e.g. sand) can settle causing damage in the pump. Maintaining sand influx is necessary to produce oil at economic rates. If a mechanical failure or a wellbore or pump blockage by sand occurs, a workover is required. Tubular goods are withdrawn, and before reinstallation, the well is thoroughly cleaned of sand using a mechanical bailer, a pump-to-surface truck, a jet pump, foam treatment, or other techniques. Oil production is reinitiated after pump reinstallation.

In an embodiment, a method for suspending and transporting proppant on the surface (e.g. above ground) includes a step of mixing an aqueous fluid and proppant and transporting the combination through at least one pump, wherein the fluid includes a polymer that includes at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof.

Compositions of the present disclosure can also be used in gravel packing methods. Some oil and gas wells are completed in unconsolidated formations that contain loose fines and sand. When fluids are produced from these wells, the loose fines and sand can migrate with the produced fluids and can damage equipment, such electric submersible pumps (ESP) and other systems. For this reason, completions for these wells can require sand screens for sand control. For hydrocarbon wells, esp. horizontal wells, the completion has screen sections with a perforated inner tube and an overlying screen portion. The purpose of the screen is to block the flow of particulate matter into the interior of the production tubing.

A gravel pack operation is one way to reduce the inflow of particulate matter before it reaches the sand screen. In the gravel pack operation, gravel (e.g., sand) is packed in the borehole annulus around the sand screen. The gravel is a specially sized particulate material, such as graded sand or proppant. When packed around the sand screen in the borehole annulus, the packed gravel acts as a filter to keep any fines and sand of the formation from migrating with produced fluids to the sand screen. The packed gravel also provides the producing formation with a stabilizing force that can prevent the borehole annulus from collapsing. In general, gravel packing is used to stabilize the formation and maintain well productivity. Gravel packing is applied in conjunction with hydraulic fracturing, but at much lower pressures.

In an embodiment, a gravel packing method includes a step of transporting a fluid through at least one pump and a subterranean gravel pack, wherein the fluid includes a polymer that includes at least one hydrophobic monomer selected from n-hexyl (meth)acrylate, n-octyl (meth)acrylate, octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof and at least one hydrophilic monomer selected from acrylate, acrylate salts, acrylamide, 2-acrylamido-2-methylpropane sulfonic acid, 2-acrylamido-2-methylpropane sulfonic acid salts and combinations thereof.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting.

EXAMPLE 1

Synthesis of an Associative Polymer (PPS) (poly acrylamide/AMPS/LMAM 2,000,000 g/mol)

29.3 g of a 30% SDS solution, 89.03 g of distilled water and 1.66 g of lauryl methacrylamide (LMAM) monomer were introduced into a 500 ml round-bottom flask at room temperature (20° C.). The mixture was stirred using a magnetic stirrer bar for 6 hours, until a clear micellar solution was obtained. 32.9 g of the micellar solution thus prepared, 7.53 g of water, 40.7 g of acrylamide (aqueous solution at 50% by weight), 32 g of AMPS (aqueous solution at 51% by weight), 0.454 g of Rhodixan A 1 (ethanol solution at 1.0% by weight) and 6.00 g of ammonium persulfate (aqueous solution at 0.67% by weight) were introduced into a 250 ml round-bottom flask at room temperature (20° C.). The mixture was degassed by sparging with nitrogen for 20 minutes. 1.5 g of sodium formaldehyde sulfoxylate, in the form of an aqueous solution at 0.13% by weight, were added to the medium, in a single portion. The mixture was degassed by sparging with nitrogen for 15 minutes. The polymerization reaction was then left to proceed with stirring for 16 hours at room temperature (20° C.).

EXAMPLE 2

Hydration Viscosity

A PPS polymer powder prepared in Example 1 was added into 0.3% choline chloride in a Waring blender at high shear rate (10,000 RPM) for 3 minutes, then centrifuged to remove trapped bubbles. The viscosity was measured using Ofite 1100. Typical viscosity of 0.3% polymer was 200-1000 cps at room temperature (25° C.) and 100 s-1.

EXAMPLE 3

Viscosity Tests for Proppant Suspension

A PPS polymer powder made using Example 1 was added into 0,3% choline chloride in a blender at shear rate (10,000 RPM) for 3 minutes, then centrifuged to remove trapped bubbles. The rheology test was carried out immediately after centrifuging using OFITE 1100 viscometer under 400 psi pressure. Shear rate ramp of 100, 75, 50 and 25 s$^{-1}$ was performed once the temperature reached the target. The temperature was raised incrementally from 80 F to 425 F. In general, polymer solutions exhibiting viscosities higher than 50 cps are able to suspend sand.

EXAMPLE 4

Sand Suspension Tests

Sand settling test was conducted with 0.3% polymer powder from Example 1 (PPS) in fresh water. 400 g fluid and 250 g sand was mixed well, and then placed in a 180° F. oven. Sand was still suspended well after 3 hours and 24 hours.

For comparison, 0.42% guar powder was dispersed in fresh water. 400 g guar fluid and 250 g sand was mixed and heated to 65° C. Sand separation was measured at 1 hour, 3 hours and 24 hours. After 3 hours at 65° C., there was about 50% sand setting for the guar solution compared to no sand separation observed in PPS polymer solution at 0.3%. After 24 hours at 65° C., there was almost total sand settling for guar compared to no sand settling for PPS polymer solution.

EXAMPLE 5

Viscosity Reduction Using a Breaker 0.1% ammonium persulfate (APS) was added to prepared 0.3% PPS polymer solution in Example 3, which was then blended and centrifuged. The rheology test was carried out immediately after centrifuging using OFITE 1100 viscometer under 400 psi pressure at 250 F and 100 s$^{-1}$ shear rate. The viscosity decreased significantly to close to 0 cps.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A method for fracturing a subterranean formation, comprising the step of injecting an aqueous fracturing fluid into at least a portion of the subterranean formation at pressures sufficient to fracture the formation, wherein the fracturing fluid comprises a polymer comprising:

at least one hydrophobic monomer selected from the group consisting of octyl (meth)acrylamide, lauryl (meth)acrylate, lauryl (meth)acrylamide, myristyl (meth)acrylate, myristyl (meth)acrylamide, pentadecyl (meth)acrylate, pentadecyl (meth)acrylamide, cetyl (meth)acrylate, cetyl (meth)acrylamide, oleyl (meth)acrylate, oleyl (meth)acrylamide, erucyl (meth)acrylate, erucyl (meth)acrylamide, and combinations thereof; and at least one hydrophilic monomer selected from the group consisting of acrylate, acrylate salts, acrylamide, 2-acrylamido-2-methylpropane sulfonic acid, 2-acrylamido-2-methylpropane sulfonic acid salts and combinations thereof, wherein at least a portion of solid particles are (a) included in the injected aqueous fracturing fluid, (b) contacted with the injected aqueous fracturing fluid within the subterranean formation subsequent to the step of injecting, or (c) both included in the injected aqueous fracturing fluid and contacted with the injected aqueous fracturing fluid within the subterranean formation subsequent to the step of injecting; and associating the polymer with the portion of the solid particles, in the subterranean formation, and thereby employing the associated polymer as (i) a dispersing and stabilizing agent for dispersion of the particles, and (ii) an agent for control of fluid loss.

2. The method of claim 1, wherein the polymer comprises the at least one hydrophilic monomer in a total amount from about 50 wt % to about 99.9 wt % of the polymer.

3. The method of claim 1, wherein the polymer comprises the at least one hydrophobic monomer in a total amount from about 0.01 wt % to about 50 wt % of the polymer.

4. The method of claim 1, wherein prior to the step of injecting the aqueous fracturing fluid, the polymer is in a powder form comprising a particle size of from about 5 μm to about 400 μm.

5. The method of claim 1, wherein a terminal end position of the polymer comprises a thiocarbonylthio functional group.

6. The method of claim 1, wherein the polymer has a molecular weight of from about 10,000 to about 20,000,000.

7. The method of claim 1, wherein the aqueous fracturing fluid comprises the polymer in an amount ranging from about 0.001 wt % to about 10 wt %, based upon the total weight of the aqueous fracturing fluid.

8. The method of claim 1, wherein the aqueous fracturing fluid further comprises a surfactant.

9. The method of claim 8, wherein the surfactant is present in an amount ranging from about 0.001 wt % to about 50 wt %, based on the weight of the polymer.

10. The method of claim 1, wherein the portion of the solid particles comprises a proppant.

11. The method of claim 10, wherein the proppant is present in an amount ranging from about 20 wt % to about 60 wt %, based on the total weight of the aqueous fracturing fluid.

12. The method of claim 10, wherein the aqueous fracturing fluid suspends the proppant at a temperature of about 68° F. to about 350° F.

13. The method of claim 1, wherein the method further comprises injecting a breaker into at least a portion of the subterranean formation.

14. The method of claim 13 wherein the breaker is selected from the group consisting of peroxides, persulfates, peracids, bromates, chlorates, chlorites, and combinations thereof.

15. The method of claim 1, wherein the aqueous fracturing fluid comprises a fluid selected from the group consisting of fresh water, sea water, brines, salt water, produced water, recycled water, industrial waste water, waste water associated with oil production, and combinations thereof.

16. The method of claim 1, wherein the polymer comprises the at least one hydrophilic monomer in a total amount from about 80 wt % to about 99.9 wt % of the polymer; wherein the polymer comprises the at least one hydrophobic monomer in a total amount from about 0.01 wt % to about 20 wt % of the polymer; wherein the aqueous fracturing fluid comprises the polymer in an amount ranging from about 0.001 wt % to about 10 wt %, based upon the total weight of the aqueous fracturing fluid; and wherein the aqueous fracturing fluid is capable of suspending particles for a period of 24 hours.

17. The method of claim 1, wherein the at least one hydrophobic monomer is selected from the group consisting of:
lauryl (meth)acrylate, lauryl (meth)acrylamide, myristyl (meth)acrylate, myristyl (meth)acrylamide, pentadecyl (meth)acrylate, pentadecyl(meth)acrylamide, cetyl (meth)acrylate, cetyl (meth)acrylamide, oleyl (meth) acrylate, oleyl (meth)acrylamide, erucyl (meth)acrylate, erucyl (meth)acrylamide, and combinations thereof.

18. The method of claim 1, wherein the aqueous fracturing fluid further comprises ethylene glycol, propylene glycol or ethylene glycol monobutyl ether.

19. The method of claim 1, wherein the aqueous fracturing fluid consists essentially of:
the polymer;
an aqueous fluid;
the portion of the solid particles;
at least one additive selected from the group consisting of mineral oil, a hydrating surfactant, a clay stabilizer, corrosion inhibitors, iron control agents, calcium sulfate inhibitors, scale inhibitors, a mutual solvent, non-emulsifiers, anti-slug agents, and combinations thereof,
wherein the hydrating surfactant is selected from the group consisting of tridecyl alcohol ethoxylate and EO/PO block copolymers.

20. The method of claim 19, wherein the mutual solvent is ethylene glycol, propylene glycol or ethylene glycol monobutyl ether.

21. The method of claim 19, wherein the polymer is formed by micellar polymerization.

* * * * *